United States Patent [19]

Pearson: Bill C.

[11] Patent Number: 4,961,945

[45] Date of Patent: Oct. 9, 1990

[54] FOOD PRESERVATIVE

[76] Inventor: Pearson: Bill C., 3513 S. E. 47th St., Oklahoma City, Okla. 73135

[21] Appl. No.: 69,978

[22] Filed: Jul. 6, 1987

[51] Int. Cl.$^5$ ............................ A23B 4/00; A23B 7/00
[52] U.S. Cl. .................................. 426/269; 426/335; 426/321; 426/331; 426/332; 426/532; 426/547
[58] Field of Search ............... 426/335, 321, 269, 331, 426/332, 333, 531, 532, 547, 541, 544, 268

[56] References Cited

U.S. PATENT DOCUMENTS

| | | | |
|---|---|---|---|
| 164,659 | 6/1875 | Reckhow et al. | 426/268 |
| 1,805,458 | 5/1931 | Rogers | 426/546 X |
| 2,004,354 | 6/1935 | Tierney | 426/268 |
| 2,320,486 | 6/1943 | Stuart | 426/262 |
| 2,511,804 | 6/1950 | Hall et al. | 426/451 |
| 2,874,059 | 2/1959 | Powers et al. | 426/268 |
| 3,453,117 | 7/1969 | Swisher | 426/231 |
| 3,987,208 | 10/1976 | Rahman et al. | 426/326 |
| 4,006,257 | 2/1977 | Kolk | 426/269 |
| 4,670,288 | 7/1987 | Ikari et al. | 426/335 |

FOREIGN PATENT DOCUMENTS 7014871 5/1970 Japan .

*Primary Examiner*—Marianne Cintins

[57] ABSTRACT

A food preservative composition comprising alum and citric acid and a method for using same. The composition retards deterioration of fruits, vegetables and meats, without substantially changing the flavor, appearance, odor or texture of the food.

8 Claims, No Drawings

FOOD PRESERVATIVE

FIELD OF THE INVENTION

The present invention relates generally to food preservatives and to methods for preventing foods.

SUMMARY OF THE INVENTION

The present invention comprises a composition for preserving foods comprising citric acid and alum mixed in relative amounts sufficient to treat the food to be preserved. The present invention also comprises a method for preserving food comprising contacting the food with a composition comprising citric acid and alum mixed in relative amounts sufficient to treat the food to be preserved.

DETAILED DESCRIPTION OF THE PREFERRED EMBODIMENT

The present invention comprises a food preservative which is useful for preserving a wide variety of foods, such as vegetables, fruits, salad greens and seafood and fowl. When treated in accordance with the present invention, foods may be prepared well in advance of use or consumption and yet may be maintained in fresh condition.

Treatment with this preservative retards browning of peeled fruits, such as apples, bananas and peaches, and peeled vegetables, such as avocadoes, carrots and potatoes. The present preservative also will keep salad greens and other leafy vegetables, such as lettuce and cabbage, crisp for a longer time than when untreated. Further, this preservative may be used on meat, such as fish and seafood, including shrimp, and fowl. The treatment of fish filets in accordance with the present invention prior to freezing or refrigeration lessens dehydration, odor and texture changes which otherwise occur.

The preservative of this invention comprises a mixture of alum and citric acid. Both these substances are commercially available in several forms.

"Alum" as used herein refers to several substances, including aluminum ammonium sulfate, aluminum sulfate, aluminum sodium sulfate and aluminum potassium sulfate. The preferred alum for practicing the present invention is aluminum ammonium sulfate, hereafter referred to as ammonium alum, and preferably in food processing grade.

Ammonium alum is commercially available in both a powder form and in a crystal or granular form. Suitable ammonium alum preparations (food processing grade) in both powder and granular form are available from the Holland Company (Adams, Mass.).

Preferably, the alum in the composition of this invention comprises a mixture of powder and crystal ammonium alum and preferably in about equal parts (by weight). The use of some granular alum reduces or eliminates the need of a decaking agent which may be necessary when only the powdered alum is used in the composition.

The composition of the present invention also comprises citric acid, preferably in anhydrous, granular form. A suitable citric acid preparation (U.S.P., F.C.C.) is available from Pfizer, Inc., Chemical Division (New York) (Product No. H2042-05H, U.S.P., F.C.C.).

The alum and citric acid are mixed in relative amounts sufficient to treat the food to be preserved. "Treated" as used herein refers to an altered condition of foods resulting from reaction of the food with the composition of the present invention so that deterioration, i.e., discoloration, dehydration, bad odors, and/or loss of crispness, is slower than in foods not reacted with the present composition.

In the preferred composition, the amount of alum exceeds the amount of citric acid, amounts being measured in dry weight. More preferably, the ratio of alum to citric acid is at least 2:1 or greater. Most preferably, the ratio (in dry weight) of alum to citric acid is about 7:1.

While the composition of the present invention may be used in dry form, in most instances it will be preferable to mix the composition with water. Tap water is preferred as it is readily available. It is preferable first to dissolve 1 cup of the dry composition in about 1 quart of slightly warm water (about 130° F.). Then, the solution is diluted as desired, preferably by adding about 2¾ gallons of cold water.

Accordingly, the composition will preferably comprise water in an amount sufficient to render the composition liquid. Depending on the amount of water added, the liquid composition may be made to have a wide range of viscosity. Generally, the less viscous solution is preferred. A preferred final preparation comprises about 8 ounces (by volume) or about 1 cup of dry composition mixed in about 1 to about 6 gallons of water, and most preferably about 1 cup in about 3 gallons of water.

In accordance with the method of the present invention, the food to be treated first is prepared, either for serving or storage, such as by freezing. The type of preparation will depend on the nature of the food and whether it is to be served or stored.

In most instances, preparation will include cleaning the food and then cutting, tearing, slicing or chopping the food into pieces of the desired shape and size for serving. Foods such as potatoes, apples and bananas, for example, may also be peeled. Fish may be cleaned and cut into filets of a desired serving size. Shellfish, such as shrimp, may be cooked, peeled or deshelled, and deveined.

After the food is prepared as desired, it next is contacted with the composition of the present invention, as described above. Preferably, this is carried out in a manner which allows a substantial portion of the surface of the food to be contacted with the composition. To this end, it often will be preferable to mix the composition in water to provide a liquid. However, in some instances, the dry composition may be used, such as where sufficient moisture or liquid is provided in the prepared food.

The composition may be poured or sprinkled generously over the prepared food. Then the food and the composition are gently folded, or tossed together, to allow the bits of prepared food to be substantially coated with the composition. Alternately, it may be preferred to soak the food in the preservative solution of this invention, and this may be carried out in a large bowl or a sink.

The treated food then is allowed to stand or soak for a period of time sufficient to permit the composition to react with the food, that is, to cause the treated food to remain fresh longer than it would have untreated. The standing or soaking period preferably will be between about 30 seconds and about 10 minutes, and more preferably between about 1 minute and about 8 minutes, and most preferably about 3 to about 5 minutes.

After the reaction period, the excess composition is removed. Usually, removal is carried out by simply allowing the food to drain in a collander or strainer or the like. The recovered excess composition may be reused.

After the excess composition has been removed from the treated food, the food then may be stored, such as by freezing or refrigeration, until it is to be used or consumed. For storage, the treated food preferably is placed in a separate covered and sealed container or otherwise suitably wrapped. The particular storage method will depend on the type of food.

EXAMPLE 1: LETTUCE

A head of lettuce was washed and cut into salad size pieces. The pieces were then divided into two equal batches. One batch was treated in accordance with the present invention, and one was not. Specifically, the batch to be treated was soaked for about 3 minutes in a solution comprising about 8 ounces (dry weight) of a dry composition comprising 7 parts ammonium alum to 1 part citric acid dissolved in 1 quart of warm (130° F.) water and then dissolved with an additional 2¾ gallons cold tap water. The treated batch was then drained. The treated and untreated batches were placed in separate airtight containers and refrigerated. At regular intervals the two batches were observed for changes in texture, namely wilting, and for changes in appearance, namely browning or darkening. The untreated batch began to wilt and discolor after about 12 hours, while the treated batch remained fresh. The treated batch did not begin to wilt or discolor until after about 120 hours, or about 5 days.

EXAMPLE 2: APPLES

A large red delicious apple was washed, peeled and sliced, and the slices were divided into equal batches of several slices each. One batch was treated as in Example 1 above. Then each batch was placed in an airtight plastic bag and refrigerated. The untreated batch began to turn brown after only about 20 minutes, while the treated batch remained white and crisp for about 12 hours.

EXAMPLE 3: PEACHES

A large ripe peach was washed, peeled and sliced, and the slices were divided into equal batches. One batch was treated as in Example 1 above. Then each batch was placed in a sealed plastic bag and refrigerated. The batches were observed at regular intervals. The untreated batch began to turn brown after only about 20 minutes, while the treated batch maintained its color and crispness for about 12 hours.

EXAMPLE 4: POTATOES

A large baking (Idaho) potato was washed, peeled and sliced, and the slices were divided into equal batches of about 6 slices each. One batch was treated as in Example 1 above. Then each batch was placed in a sealed plastic bag and refrigerated. The batches were observed at regular intervals. The untreated batch began to turn brown after only 30 minutes, while the treated batch remained white and crisp for about 144 hours, or 6 days.

EXAMPLE 5: FISH FILETS

Filets of fresh catfish and sole were prepared and treated as in Example 1. Each filet was then placed in a sealed plastic bag and refrigerated. The filets were observed regularly. The sole filet remained fresh for about 5-6 days, and the catfish filet remained fresh for about 7 days. It was observed that the treated filets remained well hydrated and exhibited no undesirable "fishy" odor or slickness of surface characteristic of refrigerated filets after about 24 to 72 hours. Normally (that is, when not treated with the composition of the present invention), fish filets will remain fresh and edible for only about 24-72 hours. It has been separately observed that filets treated before freezing become less dehydrated as a result of the freezing than do filets treated in accordance with this invention.

Based on the above, it is shown that the composition and method of the present invention provide for preservation of salad greens and a variety of fruits, vegetables and meats. Foods treated in accordance with this invention may be maintained in a fresh condition for long periods of time. Further, treatment with this composition does not substantially affect the original texture, appearance, odor or flavor of the food and involves litte or no risk of an allergic or other untoward reaction.

Changes may be made in the nature, composition, operation and arrangement of the various elements, steps and procedures described herein without departing from the spirit and scope of the invention as defined in the following claims.

What is claimed is:

1. A composition for preserving food, consisting essentially of citric acid and alum wherein the ratio of alum to citric acid is at least 2:1.

2. The composition of claim 1 in which the alum is aluminum ammonium sulfate.

3. The composition of claim 1 wherein the composition is mixed with water in an amount sufficient to render the composition liquid.

4. The composition of claim 3 in which the alum is aluminum ammonium sulfate.

5. A food preservation method comprising:
   contacting a prepared food with a composition consisting essentially of citric acid and alum wherein the ratio of alum to citric acid is at least 2:1.

6. The method of claim 5 in which the alum is aluminum ammonium sulfate.

7. The method of claim 5 in which the composition is mixed with water in an amount sufficient to render the composition liquid.

8. The method of claim 7 in which the alum is aluminum ammonium sulfate.

* * * * *

UNITED STATES PATENT AND TRADEMARK OFFICE
CERTIFICATE OF CORRECTION

PATENT NO. : 4,961,945
DATED : October 9, 1990
INVENTOR(S) : Bill C. Pearson

It is certified that error appears in the above—identified patent and that said Letters Patent is hereby corrected as shown below:

Col. 1, line 6, please delete the word "preventing" and substitute therefor the word --preserving--.

Signed and Sealed this

Twenty-eighth Day of January, 1992

*Attest:*

HARRY F. MANBECK, JR.

*Attesting Officer*      *Commissioner of Patents and Trademarks*